United States Patent
Mol

(10) Patent No.: US 6,328,077 B1
(45) Date of Patent: Dec. 11, 2001

(54) INTERWOVEN BELT FABRIC

(75) Inventor: Edward T. Mol, Marne, MI (US)

(73) Assignee: Mol Belting Company, Grand Rapids, MI (US)

( * ) Notice: Subject to any disclaimer, the term of this patent is extended or adjusted under 35 U.S.C. 154(b) by 0 days.

(21) Appl. No.: 09/430,736

(22) Filed: Oct. 29, 1999

Related U.S. Application Data

(60) Provisional application No. 60/106,241, filed on Oct. 29, 1998.

(51) Int. Cl.[7] .............. D03D 1/00; B60R 22/12
(52) U.S. Cl. ............ 139/383 R; 442/203; 139/413; 139/383 A; 297/468; 280/801.1
(58) Field of Search ............ 442/203; 297/468; 139/383 R, 413, 383 A; 280/801.1

(56) References Cited

U.S. PATENT DOCUMENTS

| | | | |
|---|---|---|---|
| 3,872,895 | * 3/1975 | Takada | 139/383 R |
| 4,071,050 | 1/1978 | Codorniu . | |
| 4,344,464 | * 8/1982 | Thompson et al. | 139/383 A |
| 4,611,639 | * 9/1986 | Bugge | 139/383 A |
| 4,981,161 | 1/1991 | Pickering et al. . | |
| 5,152,326 | * 10/1992 | Vohringer | 139/383 A |
| 5,376,440 | 12/1994 | Koseki . | |
| 5,769,130 | * 6/1998 | Brielmann | 139/22 |

* cited by examiner

Primary Examiner—Andy Falik
(74) Attorney, Agent, or Firm—Rader, Fishman, Grauer & McGarry, An Office of Rader, Fishman & Grauer PLLC

(57) ABSTRACT

An interwoven belting fabric for using conveyors, including treadmills, is constructed of a dual layer of weft yarns comprising adjacent couplets, and a plurality of binder warp yarns. Each binder warp yarn extends over of couplets of weft yarns, and under a plurality of adjacent couplets of weft yarns so that the warp yarns extends under more couplets in the lower layer then extends over couplets in the upper layer.

18 Claims, 2 Drawing Sheets

INTERWOVEN BELT FABRIC

This application claims benefit of provisional No. 60/106,241 filed Oct. 29, 1998.

BACKGROUND OF THE INVENTION

1. Field of the Invention

This invention relates to a belts for use on conveyors, treadmills, and the like, and more particularly to an interwoven belt fabric for use in such belts.

2. Background Art

Endless belts are typically formed by joining opposite ends of a section of belt material and used in a number of different applications. One commonly known application for such endless belts is in physical exercise equipment such as treadmills, as well as in various material handling applications such as check-out counters in stores, and the like.

In a treadmill used for physical exercise, a motor driven belt extends over a flat running deck. The typical treadmill belt consists of woven material provided with a top layer of polyvinyl chloride or the like. Since the woven belt material forming the bottom surface of the woven belt is forced into contact with the top surface of the running deck by the weight of the person using the exercise equipment, the belt preferably has specific characteristics such that the belt has a low coefficient of friction with the deck, has a consistent stability when under load, produces a minimum noise and provides enhanced performance with the addition of lubricants between the surface of the deck and the belt.

The type of fabric used, to a very large extent, determines certain characteristics of the belt, such as the coefficient of friction, ability to dissipate heat, ability to absorb lubricants, stability, and noise generation. Typically, in prior art belts, the quieter belts have a higher coefficient of friction and belts made with a multi-filament warp yarns (i.e., yarns with long staple lengths) tend to have a lower coefficient of friction than spun warp yarns (i.e., yarns with short staple lengths). Furthermore, treadmill belts made with a typical plain weave fabric using multi-filament warp yarns and monofilament fibers in the weft generally have a relatively low coefficient of friction, but generate a relatively high level of noise.

In a typical prior art plain weave fabric, multi-filament warp yam is alternately woven over and under a series of adjacently disposed monofilament weft fibers. In one prior art belt fabric, referred to as a one-by-three whisper weave-broken twill fabric, a multi-filament warp extends over one monofilament weft and under three monofilament wefts. Another prior art belt fabric, referred to as an interwoven fabric, has a layer of upper monofilament weft yarns and a layer of lower monofilament weft yarns. The two layers are separated by a light dernier yarn and each of a plurality of multi-filament warp binder yarns extend under one of the lower monofilament weft yarns and over an adjacent upper monofilament weft yarn.

A problem with the prior art one-ply plain weave and whisper weave belts, when used in a treadmill belt or the like, is that they lack the desired stiffness required under various loads and at various speeds. When such materials are used, a two ply belt is typically required to obtain the desired stiffness. However, two ply belts are considerably more expensive to produce than single ply belts. For example, the manufacture of a two layer belt may require as many as five passes through a belt making machine, one for the inner layer, one for the cover and three for the glue layers.

Prior art interwoven fabrics are generally considered to be undesirable for use in belts, because belts made of such fabrics are relatively noisy and the fabric typically has to be saturated with a plastic material to prevent the weft yarns from migrating out of the side of the belt.

Treadmill belts typically are operated at a higher speed than standard conveyer belts used for material handling and are typically subjected to greater concentrated loads as a result of the running action of a person on the belt. Hence, treadmill belts must be relatively stiff, particularly in the lateral direction. Such stiffness is generally obtained in prior art belts by making a thicker one-ply belt or by using two-ply belts.

Prior art one-ply and two-ply belts are comprised of a single layer of fabric or a double layer of a fabric, respectively, and a top cover layer of rubber or vinyl, or the like. The majority of such belts use monofilament yarns in their weft since material of that construction typically provides a relatively stable belt that lays flat, does not bunch up, and tracks straight. Generally, thicker belts are more stable than thinner belts and two-ply belts are more stable than one-ply belts.

However, thicker belts are typically relatively heavy and stiff in the longitudinal direction, thereby presenting a relatively higher load to the electric motor used to drive the belt. The higher load to the motor requires that a larger, more expensive motor be used which typically draws more current, all of which adds to the cost of the equipment and its operation. Therefore, a light weight, highly flexible, low friction belt is clearly desirable for applications such as treadmills. Furthermore, treadmill belts are subjected to much greater speed variations than standard conveyer belts. Hence, a belt for use in a treadmill application must be stable at high speeds as well as at low speeds.

To reduce power consumption and the generation of heat, it is desirable to reduce friction between the belt and the running deck. Hence, belts with a low coefficient of friction are preferred. Additionally, lubricants are often applied between the belt and the running deck to further reduce friction. A lubricant such as paraffin wax, Teflon®, or solventless silicone is commonly used to reduce friction between the belt and the deck. In order for a lubricant to be used effectively, however, the belt must be able to absorb a certain amount of the lubricant. Certain prior art plain weave and interwoven belts having monofilament yarns in their weft, have the desirable properties that they tend to lay flat, do not bunch up, and track straight. However, such belts do not absorb or hold lubricants well.

SUMMARY OF THE INVENTION

These and other disadvantages of the prior art are overcome in accordance with this invention by a belting fabric that comprises a plurality of adjacently disposed couplets of weft yarns forming an upper layer of weft yarns and a lower layer of weft yarns. In a plurality of warp yarns, each warp yarn extends over at least one of the couplets of weft yarns in the upper layer and under at least two of the adjacently disposed couplets of weft yarns in the lower layer so that the warp yarns extend under more couplets in the lower layer than extend over couplets in the upper layer.

In one embodiment of the invention, the plurality of warp yarns comprises three separate warp yarns. In another embodiment, each of the warp yarns extends over one of the couplets of weft yarns and under two of the couplets of adjacent weft yarns. In yet another embodiment, the plurality of warp yarns comprises four separate warp yarns and each of them extends over at least one couplet of weft yarns and under at least three adjacently disposed couplets of weft yarns.

Preferably, the weft yarns are monofilament yarns having a diameter less than 0.3 mm. In another aspect, the weft yarns are monofilament yarns having a diameter less than 0.5 mm. In another aspect, the weft yarns are 1000 denier yarns. Moreover, the belting fabric can further have a standard light denier yarn extending between the upper layer and the lower layer.

In another aspect, the invention is a method of making a belting fabric by first arranging a plurality of couplets of weft yarns adjacent one another, and weaving a first warp yarn over a first couplet of weft yarns and then under second and third couplets of weft yarns, adjacent to the first couplet. In another step, a second warp yarn is woven over a second couplet of weft yarns and under third and fourth couplets adjacent to the second couplet. In yet another step, a third warp yarn is woven over a third couplet of weft yarns and under fourth and fifth couplets adjacent to the third couplet.

In another embodiment of a method, any one or more of the warp yarns can extend under two or more adjacent couplets. In another embodiment of a method, a fourth warp yarn extends over a fourth couplet of weft yarns and under three couplets of weft yarns disposed adjacent to the fourth couplet.

An advantage of belt material constructed in accordance with the principles of the present invention is that the particular pattern of weft and warp yarns provide a belt surface texture that allows a cover material to be applied to the upper surface of the belt without the need for a glue layer, as required in prior art belts. Consequently, making belt material in accordance with the present invention results in reduced manufacturing costs. Advantageously, the belt material of the present invention has a higher stretch resistance and a lower coefficient of friction, and is thinner and lighter weight than the prior art two-ply belts previously required to obtain a desired level stability. All of this reduces power consumption. Furthermore, belting material in accordance with the present invention has improved lubricant absorption and retention properties that reduce maintenance costs. Additionally, because the present invention enables a thinner belt than prior art materials, it yields improved heat transfer characteristics.

DETAILED DESCRIPTION

Figure 1:
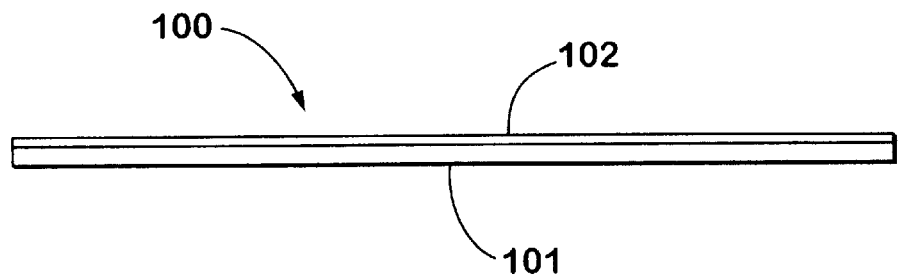
FIG. 1 is side elevational view of a section of conveyer belting material incorporating the principles of the invention.
Figure 2:
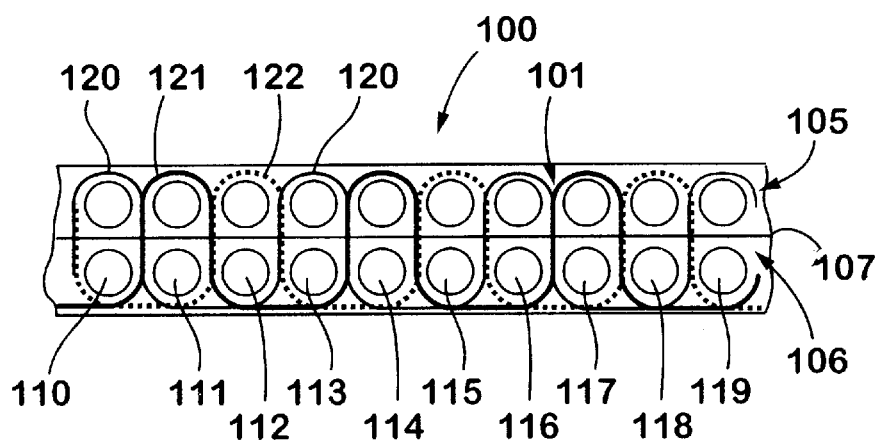
FIG. 2 is an enlarged side elevational view of the belting fabric of FIG. 1, having a weave pattern in accordance with principles of the invention.

Shown in FIG. 1 is a section of conveyor belting material 100 comprising a fabric layer 101 and a cover layer 102. The cover layer 102 may be a standard rubber or plasticized polyvinyl material or the like. One embodiment of a belting fabric 100 in accordance with the invention is illustrated in FIG. 2 in an enlarged side elevational view of a portion of the belt 100. The belting fabric of FIG. 2 includes an upper layer of monofilament weft yarns 105 and a lower layer of monofilament weft yarns 106. The individual weft yarns of layer 105 are disposed in substantial alignment with individual weft yarns of layer 106, forming a plurality of couplets, 110 through 119. The monofilament weft yarns preferably have a diameter of approximately 0.3 mm. The two layers of weft yarns 105, 106 are separated by a standard light denier yarn 107. A plurality of binder warp yarns 120,121,122, preferably 1000 denier yarns, are woven on the weft yarns to form a belt fabric in accordance with the invention.

The fabric layer 101 is woven in a repeating weaving pattern wherein three binder warp yarns 120, 121, and 122 are woven through a plurality of adjacently disposed couplets formed from aligned pairs of weft yarns of layers 105 and 106, in a specified pattern. In this pattern the first binder warp yarn 120 extends over a first aligned couplet of weft yarns 110 and under second and third couplets 111, 112, respectively; the second binder warp yarn 121 extends over the second couplet 111 and under third and fourth couplets 112,113, respectively; and the third binder warp yarn 122 extends over the third couplet 122 and under fourth and fifth couplets 113,114, respectively.

Figure 3:
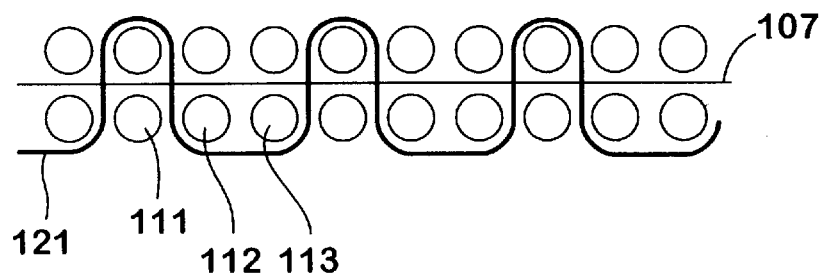
FIG. 3 illustrates the pattern of a single warp binder yarn in the weave pattern of FIG. 2.

The specific pattern of the warp yarns shown in FIG. 2 is further illustrated in FIG. 3 in which the pattern of a single binder warp yarn 120 is shown separate from the other binder warp yarns.

Figure 4:
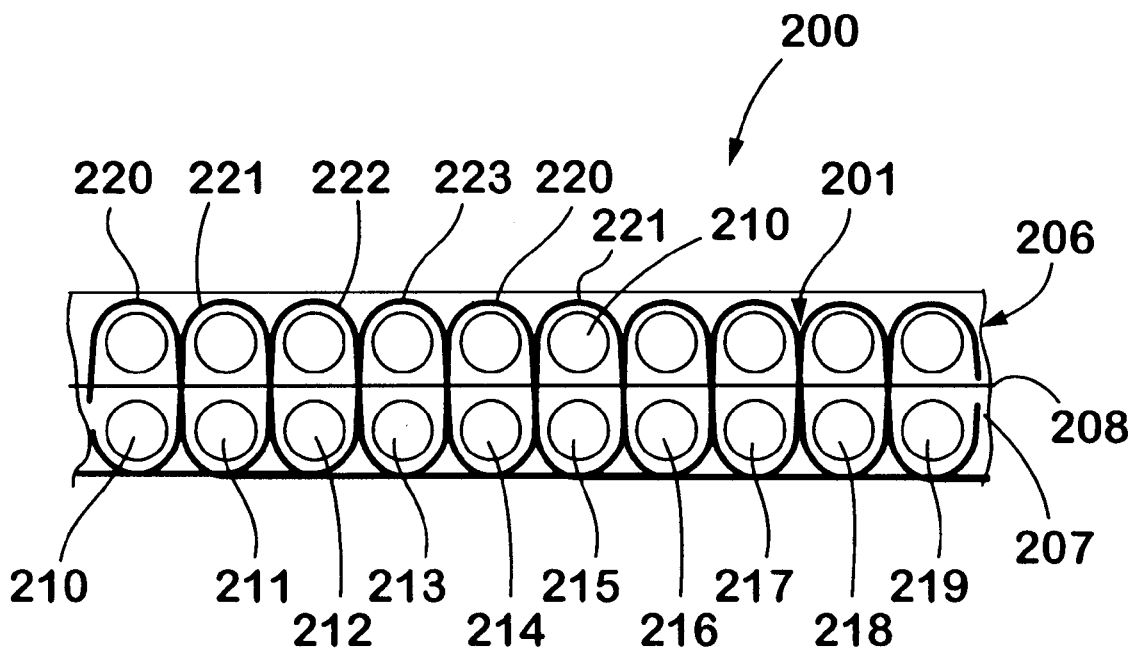
FIG. 4 is an enlarged side elevational view of a section of conveyer belting fabric of FIG. 1 having an alternate weave pattern in accordance with principles of the invention.

FIG. 4 depicts an alternate embodiment of a belt 200 in accordance with the invention wherein the fabric 201 comprises four binder warp yarns 220, 221, 222, and 223 woven into two layers of weft yarns 206,207. The layers of weft yarns 206,207 are separated by a light denier yarn 208. The binder warp yarns 220, 221, 222, 223 are preferably 1,000 denier yarns and the weft yarns 206,207 are preferably approximately 0.3 mm monofil yarns.

The fabric 201 is woven in a repeating weaving pattern wherein four binder warp yarns 220, 221, 222 and 223 are woven in a specified pattern through a plurality of couplets formed from pairs of aligned weft yarns of layers 206, 207. In this pattern the first binder warp yarn 220 extends over a first aligned couplet of weft yarns 210 and under the second, third and fourth couplets 211, 212 and 213, respectively; the second warp yarn 221 extends over the second couplet of weft yarns 211 and under the third, fourth and fifth couplets 212, 213 and 214, respectively; the third warp yarn 222 extends over the third couplet of weft yarns 212 and under the fourth, fifth and sixth couplets 213, 214 and 215, respectively; and the fourth warp yarn 223 extends over the fourth couplet of weft yarns 213 and under the fifth, sixth and seventh couplets 214, 215 and 216, respectively.

Figure 5:
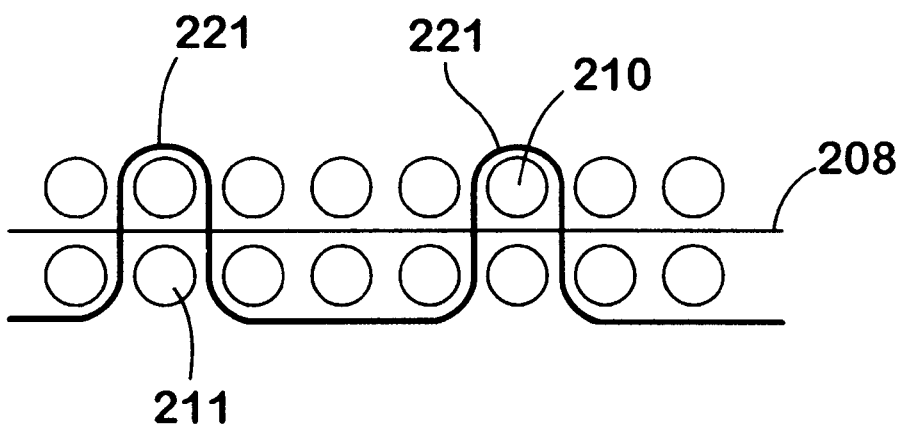
FIG. 5 illustrates the pattern of a single warp binder yarn in the weave pattern of FIG. 4.

The specific pattern of the binder yarns of FIG. 4 is further illustrated in FIG. 5 in which the pattern of a single binder warp yarn, yarn 221, is shown separate from the other binder warp yarns.

Belt material in accordance with the present invention is preferably manufactured by feeding the woven belt fabric, e.g., 100, 200, from a roll of the fabric into well known belt coating apparatus. Such apparatus typically includes a feeding mechanism extending the belt between a roller and a coating knife. A liquid PVC, such as a well known product referred to in the trade as "Plastisol," is applied in a standard fashion. The belt material with the newly applied coating is then fed into an oven and heated by infrared lamps or the like to dissolve the applied PVC. After passing through the oven, the belt material with the applied PVC is fed between a roller and a cooling drum while cooling the belt. This causes the PVC to be forced into cavities in the woven material. A particular advantage of the belting fabric in accordance with this invention is that is has cavities of substantial size that provide for proper adhesion of the PVC layer to the fabric. As a result, glue lining required for belts made of prior art belt fabrics is not required. The application of such a glue lining requires that the belt material be fed through a glue application mechanism, similar to the PVC application mechanism. Accordingly, a belt made in accordance with the present invention is substantially less expensive to manufacture.

What is claimed:

1. A belting fabric comprising a plurality of adjacently disposed couplets of weft yarns forming an upper layer of weft yarns and a lower layer of weft yarns and further comprising a plurality of warp yarns each extending over at least one of the couplets of weft yarns in the upper layer and under at least two of said adjacently disposed couplets of weft yarns in the lower layer, wherein the warp yarns extend under more couplets in the lower layer than extend over couplets in the upper layer.

2. The belting fabric in accordance with claim 1 wherein the plurality of warp yarns comprises three separate warp yarns.

3. The fabric in accordance with claim 1 wherein each of said warp yarns extends over one of said couplets of weft yarns and under two of said couplets of weft yarns.

4. The belting fabric in accordance with claim 3 wherein said weft yarns are 1,000 denier yarns.

5. The belting fabric in accordance with claim 1 wherein said plurality of warp yarns comprises four separate warp yarns and wherein each of said separate warp yarns extends over at least one couplet of weft yarns and under at least three adjacently disposed couplets of weft yarns.

6. The fabric in accordance with claim 5 wherein each of said warp yarns extends over one couplets of weft yarns and under three adjacently disposed couplets of weft yarns.

7. The belting fabric in accordance with claim 6 wherein said weft yarns having a diameter of less than 0.3 mm are monofilament yarns.

8. The belting fabric in accordance with claim 6 wherein said weft yarns having a diameter of less than 0.5 mm are monofilament yarns.

9. The belting fabric in accordance with claim 1 wherein said weft yarns are monofilament yarns.

10. The belting fabric in accordance with claim 1 wherein said weft yarns having a diameter of less than 0.3 mm are monofilament yarns.

11. The belting fabric in accordance with claim 1 wherein said weft yarns having a diameter of less than 0.5 mm are monofilament yarns.

12. The belting fabric in accordance with claim 1 and further comprising a standard light denier yarn extending between said upper layer and said lower layer.

13. A belting fabric comprising a plurality of adjacently disposed couplets of weft yarns forming an upper layer of weft yarns and a lower layer of weft yarns and a plurality of warp yarns, each of said warp yarns extending over a first of said couplets of weft yarns and under a second and a third of said couplets of weft yarns, said second of said couplets of weft yarns being disposed immediately adjacent said first of said couplets of weft yarns and said third of said couplets of weft yarns being disposed immediately adjacent said second couplets of weft yarns.

14. A belting fabric comprising a plurality of couplets of weft yarns forming an upper layer of weft yarns and a lower layer of weft yarns, and a plurality of warp yarns, each of said plurality of warp yarns extending over one of said couplets of weft yarns and under a set of three adjacently disposed couplets of weft yarns, said set of three adjacently disposed couplets of weft yarns being disposed immediately adjacent said one of said couplets of weft yarns.

15. A method of making a belting fabric, the method comprising the step of arranging a plurality of couplets of weft yarns adjacent one another and the steps of:

weaving a first warp yarn over a first of said couplets of weft yarns and under a second and a third of said couplets of weft yarns, disposed adjacent said first of said couplets;

weaving a second warp yarn over a second of said couplets of weft yarns and under a third and fourth of said couplets of weft yarns, disposed adjacent said second of said couplets; and weaving a third warp yarn over a third of said couplets of weft yarns and under fourth and fifth of said couplets of weft yarns, disposed adjacent said third of said couplets.

16. A method of making a belting fabric, the method comprising the step of arranging a plurality of couplets of weft yarns adjacent one another and the steps of:

weaving a first warp yam over a first of said couplets of weft yarns and under a second, a third and a fourth of said couplets of weft yarns disposed adjacent said first of said couplets;

weaving a second warp yarn over a second of said couplets of weft yarns and under a third, a fourth, and a fifth of said couplets of weft yarns disposed adjacent said second of said couplets;

weaving a third warp yarn over a third of said couplets of weft yarns and under a fourth, a fifth and a sixth of said couplets of weft yarns, disposed adjacent said third of said couplets; and weaving a fourth warp yarn over a fourth of said couplets of weft yarns and under a fifth, a sixth and a seventh of said couplets of weft yarns disposed adjacent said fourth of said couplets.

17. A belting fabric comprising:

a plurality of couplets of weft yarns disposed adjacent one another;

a first warp yarn extending over a first of said couplets of weft yarns and under a second and a third of said couplets of weft yarns disposed adjacent said first of said couplets;

a second warp yarn extending over a second of said couplets of weft yarns and under a third and fourth of said couplets of weft yarns disposed adjacent said second of said couplets; and a third warp yarn extending over a third of said couplets of weft yarns and under fourth and fifth of said couplets of weft yarns disposed adjacent said third of said couplets.

18. A belting fabric comprising:

a plurality of couplets of weft yarns disposed adjacent one another;

a first of warp yarn extending over a first of said couplets of weft yarns and under a second, a third and a fourth of said couplets of weft yarns disposed adjacent said first of said couplets;

a second warp yarn extending over a second of said couplets of weft yarns and under a third, a fourth, and a fifth of said couplets of weft yarns disposed adjacent said second of said couplets;

a third warp yarn extending over a third of said couplets of weft yarns and under a fourth, a fifth and a sixth of said couplets of weft yarns disposed adjacent said third of said couplets; and a fourth warp yarns extending over a fourth of said couplets of weft yarns and under a fifth, a sixth and a seventh of said couplets of weft yarns disposed adjacent said fourth of said couplets.

* * * * *

UNITED STATES PATENT AND TRADEMARK OFFICE
CERTIFICATE OF CORRECTION

PATENT NO. : 6,328,077 B1
DATED : December 11, 2001
INVENTOR(S) : Edward T. Mol

It is certified that error appears in the above-identified patent and that said Letters Patent is hereby corrected as shown below:

<u>Column 6,</u>
Line 27, "yam" should be -- yarn --.

Signed and Sealed this

Twenty-eighth Day of May, 2002

*Attest:*

*Attesting Officer*

JAMES E. ROGAN
*Director of the United States Patent and Trademark Office*